United States Patent [19]

Sawamoto

[11] Patent Number: 5,146,888
[45] Date of Patent: Sep. 15, 1992

[54] IDLE ENGINE SPEED CONTROL APPARATUS

[75] Inventor: Kunifumi Sawamoto, Kanagawa, Japan

[73] Assignee: Nissan Motor Co., Ltd., Japan

[21] Appl. No.: 718,672

[22] Filed: Jun. 21, 1991

[30] Foreign Application Priority Data

Jun. 29, 1990 [JP] Japan ........................... 2-172128

[51] Int. Cl.$^5$ ............................................. F02D 41/16
[52] U.S. Cl. ..................................... 123/339; 123/436
[58] Field of Search ............................. 123/339, 436

[56] References Cited

U.S. PATENT DOCUMENTS 4,688,535  8/1987  Küttner et al. ................... 123/436

FOREIGN PATENT DOCUMENTS 59-201936  11/1984  Japan ............................ 123/339
63-113135   5/1988  Japan ............................ 123/339
63-277828  11/1988  Japan .

OTHER PUBLICATIONS

Nainen Kikan, "Internal Combustion Engine", vol. 27, No. 341, Mar. 1988.

*Primary Examiner*—Andrew M. Dolinar
*Attorney, Agent, or Firm*—Lowe, Price, LeBlanc & Becker

[57] ABSTRACT

An idle engine speed control apparatus for a multiple cylinder and multiple throttle valve engine includes a bypass passage and an idle control valve connected to each cylinder for controlling idle engine speed. Idle engine speed at a combustion stroke of each cylinder is calculated by a control unit and adjusted to a target engine speed by feedback-controlling each idle control valve according to a signal from the control unit. Furthermore, each throttle valve and idle control valve are disposed in the vicinity of each cylinder to quickly control the engine speed in each cylinder.

7 Claims, 5 Drawing Sheets

IDLE ENGINE SPEED CONTROL APPARATUS

BACKGROUND OF THE INVENTION

1. Field of the Invention

The present invention relates to improvements in an idle engine speed control apparatus which is connected to an internal combustion engine of an automotive vehicle.

2. Description of the Prior Art

Various types of an idle engine speed control apparatus have been proposed in order to meet requirements of maintenance free and exhaust gas emissions. One typical apparatus which automatically controls an idle engine speed at a target value is disclosed, in "Nainen Kikan (Internal Combustion Engine)", Vol. 27, No. 341 published by Co. Sankaido in March, 1988. Such an idle engine speed control apparatus is provided with an idle control valve 3 in a bypass passage 2 as shown in FIG. 6. The bypass passage 2 is formed to bypass throttle valve 1 in an intake passage (no numerals). The idle control valve 3 is directly controlled by a signal from a control unit 4 so that the idle engine speed is feedback-controlled at a target value of the engine speed.

However, difficulties have been encountered in this type of conventional control apparatus, the supply timing of supplemental air is delayed by virtue of a space formed in a collector 5 downstream of the throttle valve 1. Since the supplemental air is not momentarily delayed before being supplied to the combustion chamber, the engine further lowers its idle engine speed during the delay time, thereby causing problems such as a sudden engine stop or lack of stability in the idle engine speed.

SUMMARY OF THE INVENTION

It is an object of the present invention to provide an improved idle engine speed control apparatus with which a multiple cylinder and throttle valve engine is stably operated at an idle engine speed.

Another object of the present invention is to provide an improved idle engine speed control apparatus which controls combustion in each cylinder of the engine under an idle engine speed condition.

An idle engine speed control apparatus for a multiple cylinder engine, according to the present invention, is shown in FIG. 1. The idle engine speed control apparatus includes a throttle valves, one of which is disposed in each intake manifold branch upstream of each cylinder of the engine. An air passage is connected to each intake manifold branch downstream of the throttle valve. An idle control valve is disposed in each air passage so that the position of the control valve is adjustable to control the amount of air flowing in the air passage. Target value setting means sets an idle engine speed. Crankangle detecting means is connected to the engine. Engine speed calculating means calculates engine speed at a combustion stroke of each cylinder of the engine in accordance with the detected crankangle. Feedback-controlling means controls the opening state of the idle control valve so that the calculated engine speed is brought into agreement with the target value.

With this arrangement combustion troubles in every cylinder are promptly corrected so that the problem of sudden engine stop caused by unstable idle engine speed or a dive drop in the engine speed can be avoided.

DETAILED DESCRIPTION OF THE INVENTION

Figure 2:
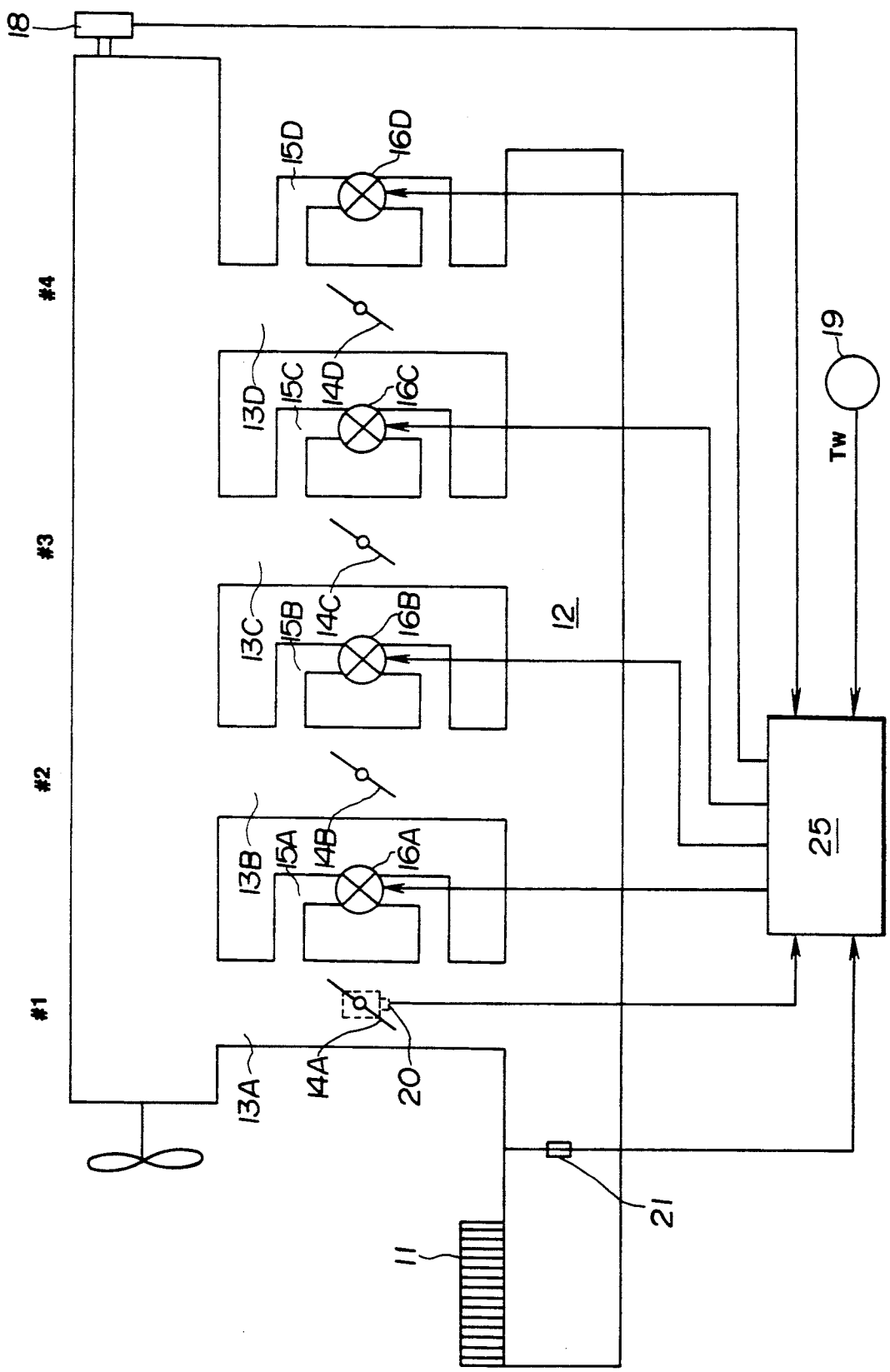
FIG. 2 is a block diagram showing an embodiment of the idle engine speed control apparatus according to the present invention.

In FIG. 2, the idle engine speed control apparatus is connected to a four cylinder internal combustion engine (no numerals) which is provided with multiple throttle valves. Intake air passed through an air cleaner 11 is temporary stored in a collector 12. The collector 12 is connected to intake manihold branches 13A, 13B, 13C and 13D through which intake air is supplied into each cylinder #1, #2, #3, #4 of the engine. Each throttle valve 14A, 14B, 14C, 14D of a multiple type is disposed in each intake manifold branch 13A, 13B, 13C, 13D so as to be located in the vicinity of each cylinder #1, #2, #3, #4. Each throttle valve 14A, 14B, 14C, 14D is interconnected with an acceleration pedal (not shown) and closes the respective intake manifold branch 13A, 13B, 13C, 13D under idle engine speed conditions.

The idle engine speed control apparatus includes numbers of bypass passages 15A, 15B, 15C, and 15D and idle control valves 16A, 16B, 16C and 16D are determined so as to correspond to the number of the throttle valves. Each throttle valve 14A, 14B, 14C, 14D is bypassed by each bypass passage 15A, 15B, 15C, 15D, and each idle control valve 16A, 16B, 16C, 16D is installed in each bypass passage 15A, 15B, 15C, 15D to open or close it.

Each idle control valve 16A, 16B, 16C, 16D is constituted by a solenoid valve which is proportionally operated in accordance with signals from the control unit 25, also part of the idle engine speed control apparatus. The ON-OFF switching of the solenoid valve is carried out in a speed of about 160 Hz. The flow rate of the supplemental air is controlled by changing the "ON" position time rate of the solenoid valve. A crankangle sensor 14 attached to the engine detects crankangle position and outputs a crankangle signal (POS signal) at every 2 degrees and a position signal (REF signal) at a predetermined crankangle such as a compression TDC.

An engine coolant sensor 19 for detecting the cooling water temperature $T_w$ is installed with the engine and electrically connected with the control unit 25. An idle switch 20 is installed to the throttle valve 14A, 14B, 14C, 14D and outputs a signal indicating that the throttle valve 14A, 14B, 14C, 14D is positioned at a fully closing state. Intake air flow rate is detected by an air flow meter 21 of a hot wire type which is disposed downstream of the air cleaner 11. The above-mentioned sensors and switches are electrically connected to and output signals to the control unit 25. The control unit 25 controls the idle control valves 15A, 15B, 15C and 15D in accordance with the control method of a flow chart of FIG. 3.

Figure 3:
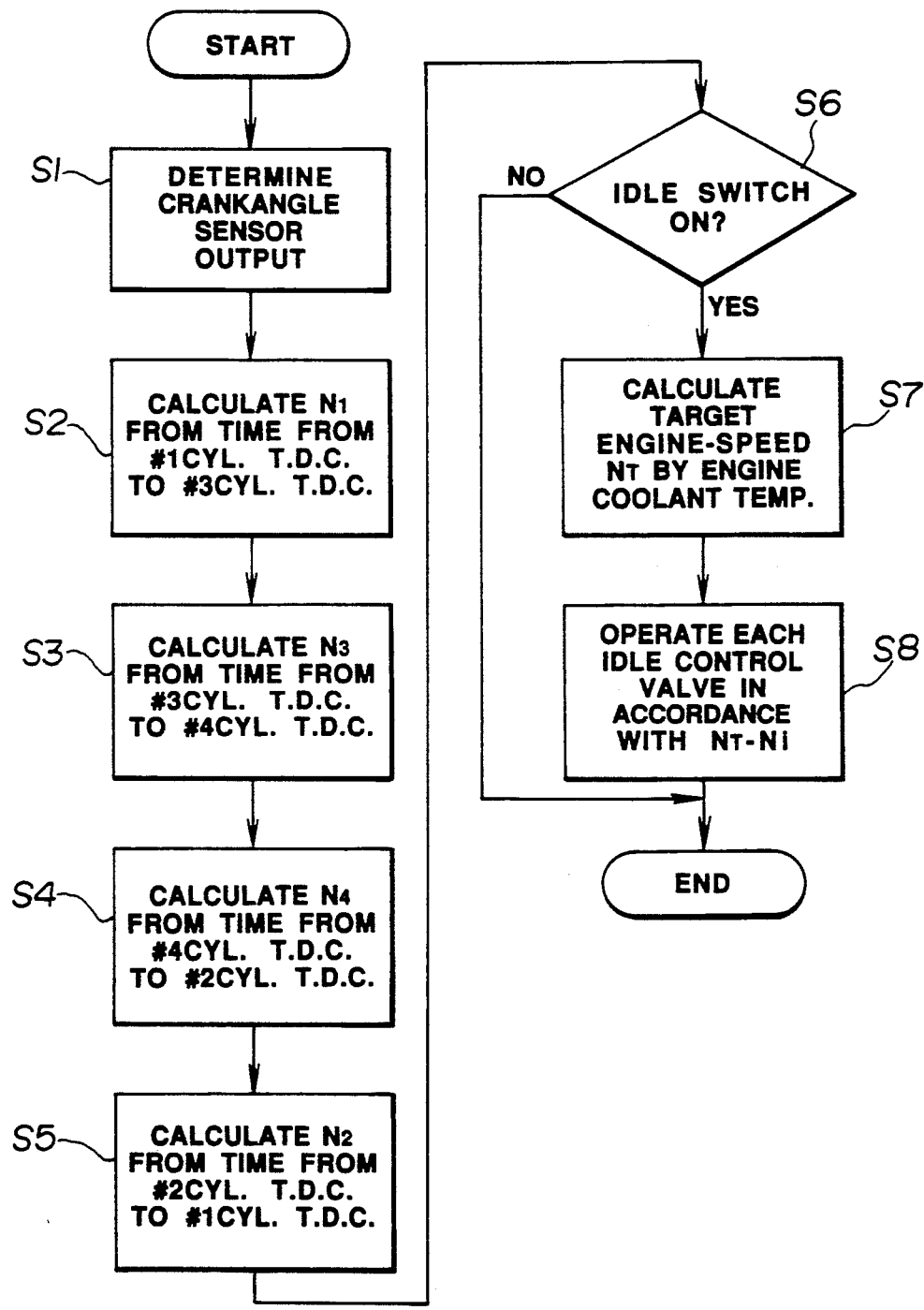
FIG. 3 is a flow chart used to explain a control operation of the embodiment of FIG. 2.
Figure 4:
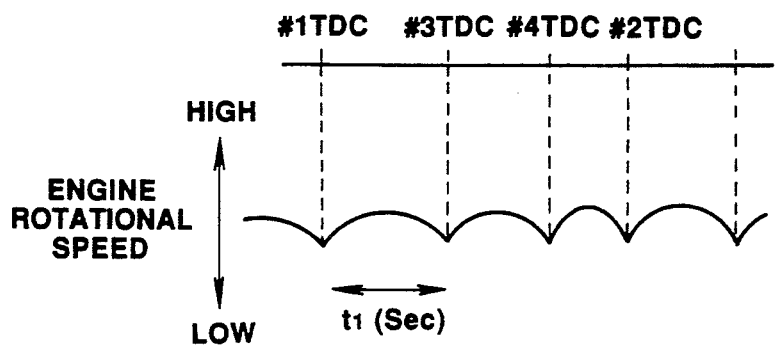
FIG. 4 is a wave form chart used to explain a calculation method of an engine speed in a combustion stroke according to the present invention.

The flow chart in FIG. 3 indicates a routine carried out by a CPU (no numerals) of a microcomputer (no numerals) at predetermined intervals. In a step S1, the CPU receives a signal from the crankangle sensor 18. In steps S2 to S5, engine speeds $N_1$ to $N_4$ are calculated in the CPU in accordance with the detected signals from the crankangle sensor 18. The steps S2 to S5 are carried out in conjunction with the engine speed calculating means 25b. As shown in FIG. 4, when a combustion stroke of the engine is carried out in the order of cylinders #1, #3, #4 and #2, a combustion stroke time $t_1$ of the cylinder #1 is calculated in a manner that clock signals of a clock installed in the microcomputer is counted from the time of the cylinder #1 TDC to the time of the cylinder #3 TDC. An engine speed $N_1$ in the combustion stroke time $t_1$ of the cylinder #1 is calculated in accordance with the following equation (1):

$$N_1 = 60/(2 \times t_1) \tag{1}$$

Since it takes $(2 \times t_1)$ seconds for one rotation of a crankshaft, the inverse number $1/(2 \times t_1)$ indicates an engine speed per second. Therefore, $60/(2 \times t_1)$ indicates engine speed per minute. The engine speed $N_1$ corresponds to the torque generated by the combustion in the cylinder #1.

$$Ip \cdot d\omega/dt = T - T_F \tag{2}$$

As shown in the previous equation (2), an angle speed $\omega(\approx t_1)$ equals to the time integral of the generated torque T, wherein Ip is a moment of inertia of the engine and $T_F$ is torque loss due to friction.

Figure 1:
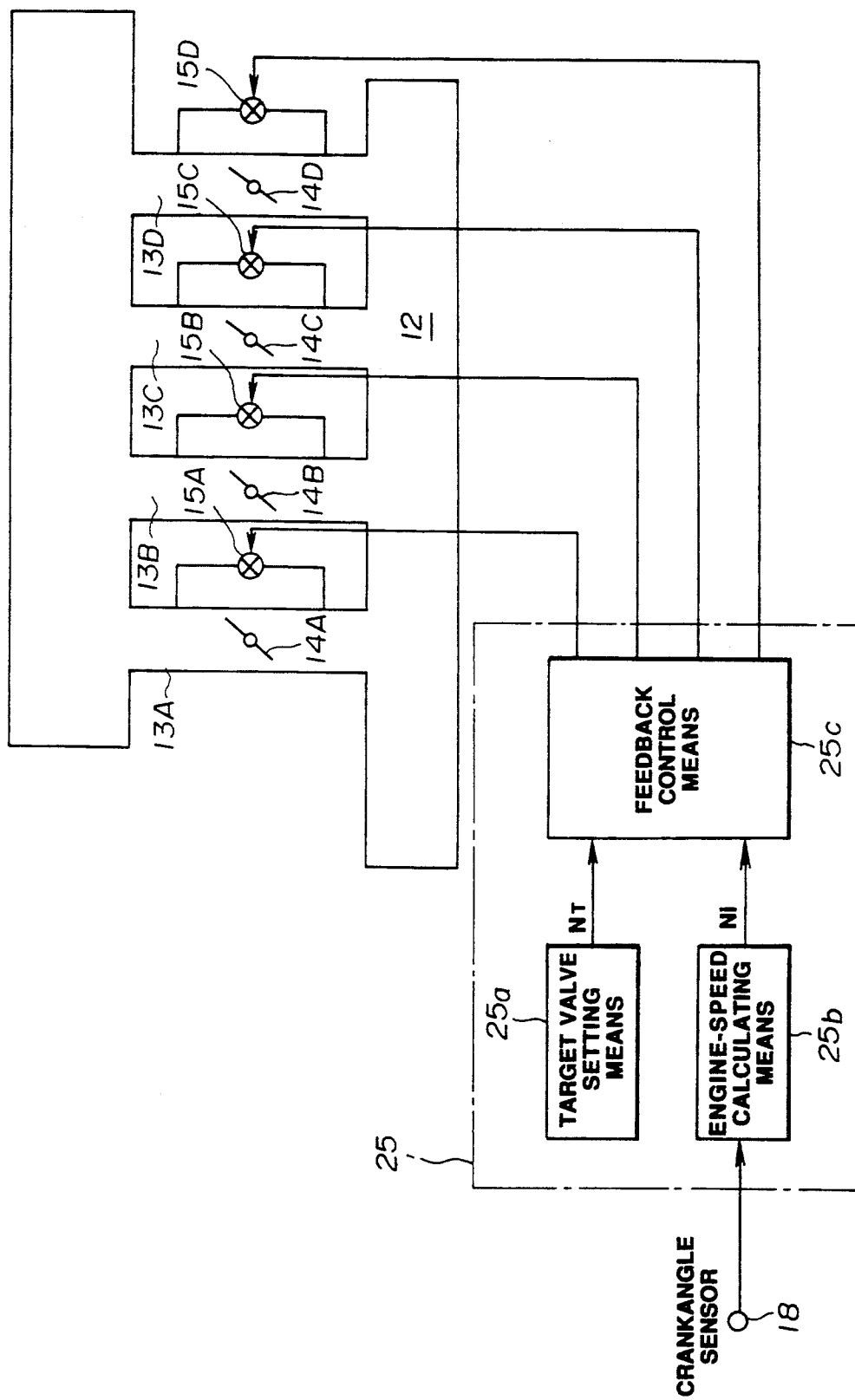
FIG. 1 is a schematic block diagram illustrating the general concept of an idle engine speed control apparatus according to the present invention.

Similarly, in steps S3 to S5, each engine speed $N_3$, $N_4$, $N_2$ corresponding to each combustion stroke of each cylinder #3, #4, #2 is calculated. In a step S6, there is a determination of whether an idle switch is turned ON or not. When the idle switch 20 is turned ON, each idle engine speed is feedback-controlled in steps S7 and S8. The step S7 corresponds to the function carried out by the target value setting means 25a illustrated in FIG. 1. In step S7, a target engine speed $N_T$ is determined with reference to engine coolant temperature $T_w$ of the graph on FIG. 5.

Figure 5:
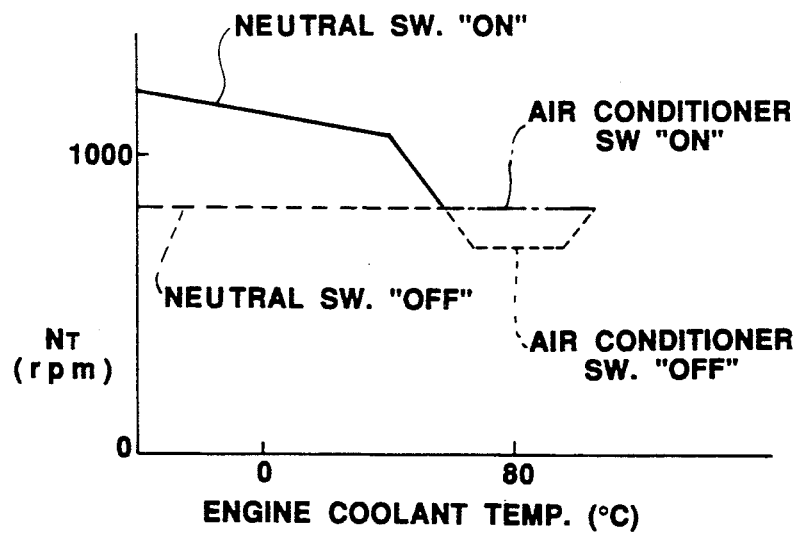
FIG. 5 is a graph illustrating characteristics associated with a target engine speed $N_T$ of the present invention.
Figure 6:
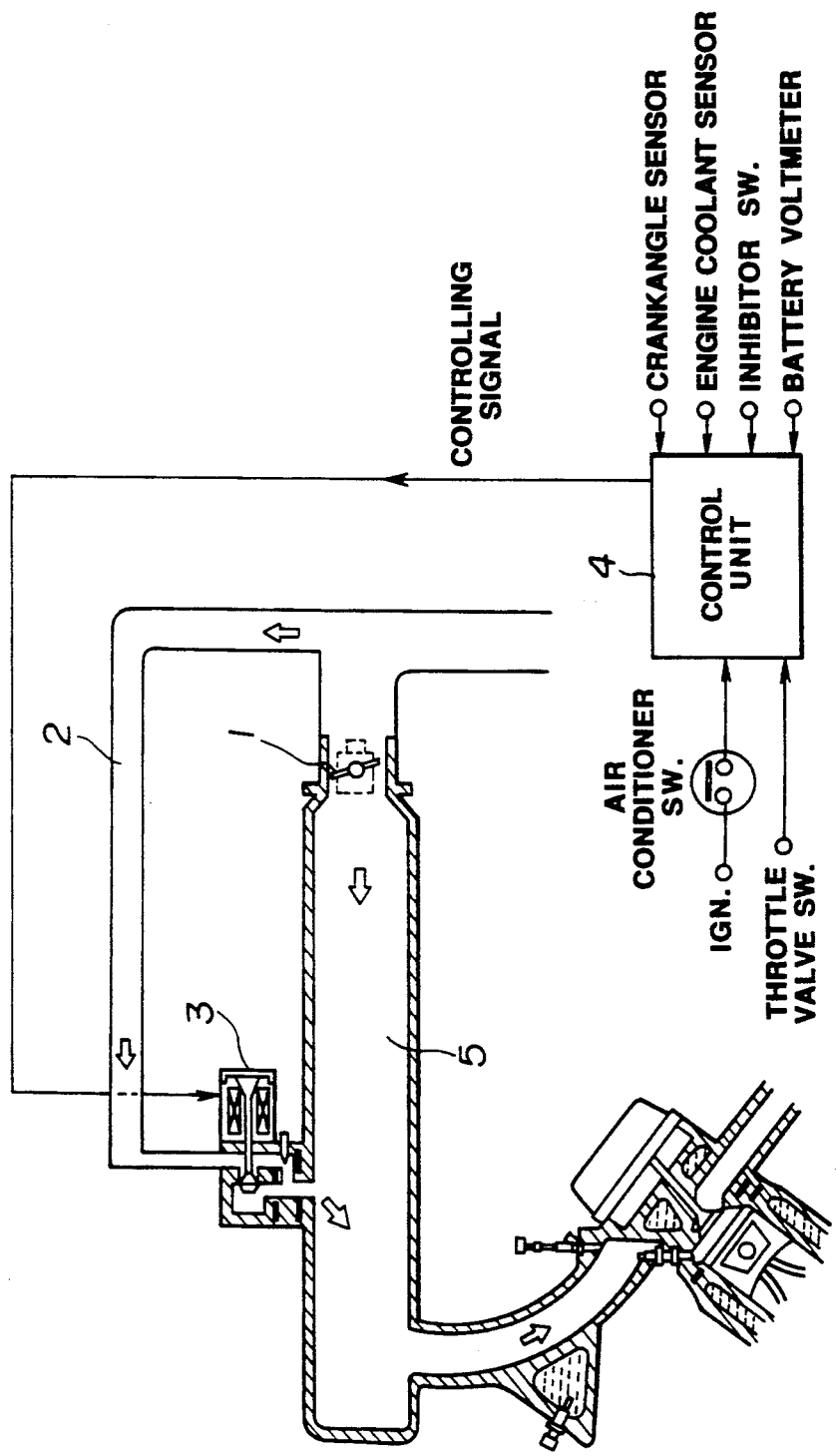
FIG. 6 is a system diagram of a conventional idle engine speed control apparatus.

As shown in FIG. 5, the target engine speed $N_T$ is determined in accordance with ON-OFF conditions of an air conditioner switch (no numerals) and a neutral switch (no numerals) in addition to the engine coolant temperature $T_w$. When the air conditioner (no numeral) is turned ON, the idle engine speed is raised in order to increase the cooling performance by the air conditioner. When the neutral switch is turned ON, the idle engine speed is also raised in order to stabilize the idle engine speed during starting conditions. Furthermore, the target engine speed $N_T$ may be determined in accordance with the elasped time from the starting of the engine, voltage on the battery, ON-OFF condition of a power steering switch or a gear position of an automatic transmission.

In a step S8 of FIG. 3, the CPU calculates a deviation $[N_T - N_i]$ (wherein reference character i indicates a cylinder No.) and outputs a control signal to the idle control valve 16A, 16B, 16C, 16D. In accordance with the signal, each idle control valve 16A, 16B, 16C, 16D is controlled so that the deviation $[N_T - T_i]$ is adjusted to zero value by changing the opening frequency of each idle control valve 16A, 16B, 16C, 16D. The step S8 is carried out in conjunction with the feedback-control means 38.

When in the cylinder #1 the lowering of the engine speed is caused due to some troubles such as informal combustion due to a lack of air, the generated torque by the cylinder #1 is lowered. Therefore, the engine speed $N_1$ in a combustion stroke of the cylinder #1 is lowered. Then the control unit 25 judges that the engine speed $N_1$ is lower than the target engine speed $N_T$ and outputs a signal to the idle control valve 16A so as to increase the opening frequency. Furthermore, since the throttle valve 14A and its bypass passage 15A are disposed in the vicinity of the cylinder #1, supplemental air is quickly supplied into the cylinder #1 upon passing through the bypass passage. With this quick supply of supplemental air, the combustion condition in the cylinder #1 is quickly improved and the idle engine speed $N_1$ is raised. Additionally, the other cylinders #2, #3 and #4 are controlled similar to the cylinder #1. Therefore, combustion troubles in every cylinder #1, #2, #3, #4 are promptly improved so that the engine can avoid the sudden engine stop which is caused by an unstable idle engine speed or a drop of the engine speed.

While the four cylinder engine has been shown and described in this embodiment according to the present invention, it will be understood that the principle of the present invention may be applied to the other types of internal combustion engines such as a six cylinder engine and the like. When the system of the present invention is applied to a six cylinder engine, the calculation of the engine speed of each cylinder is calculated on the basis of each combustion stroke which is carried out for an elapsed time corresponding to 120 degrees of crankangle rotation.

In general, the engine speed $N_i$ is calculated from a time which is taken at E degrees before the middle timing position of the combustion stroke to a time to E degrees after the middle timing position of the combustion stroke time corresponding, wherein E is $(2 \times 180)/n$ [° crankangle], wherein n is the number of cylinders of the engine.

What is claimed is:

1. An idle engine speed control apparatus for a multiple cylinder engine, comprising:
   a throttle valve disposed in each intake manihold branch upstream of each cylinder of the engine;
   means defining an air passage connected with each intake manifold branch downstream of said throttle valve;
   an idle control valve disposed in each air passage, an opening state of said control valve being changeable to control an amount of air flowing in said air passage;
   means setting a target value of an idle engine speed;
   means for detecting a crankangle of the engine;
   means for calculating an engine speed in a combustion stroke of each cylinder of the engine in accordance with said detected crankangle; and
   means for feedback-controlling the opening state of said idle control valve so that the calculated engine speed is brought into agreement with said target value.

2. An idle engine speed control apparatus as claimed in claim 1, wherein said speed controlling means is formed with a bypass passage which bypasses said throttle valve and communicate with said intake manifold, and an idle control valve installed to the bypass passage.

3. An idle engine speed control apparatus as claimed in claim 1, further comprising an idle switch which is turned ON under an idle engine speed condition, the idle engine speed control apparatus being operated when said idle switch is turned ON.

4. An idle engine speed control apparatus as claimed in claim 1, wherein said engine speed calculating means calculates to count a time from E degrees before a center timing position of a combustion stroke time to E degrees after the center timing position of the combustion cycle, wherein E is $E = (2 \times 180)/n$, wherein n is a number of cylinders.

5. An idle engine speed control apparatus as claimed in claim 1, wherein said throttle valve is disposed in the vicinity of the cylinder of the engine.

6. An idle engine speed control apparatus as claimed in claim 1, further comprising an engine coolant sensor for detecting a cooling water temperature $T_w$, which is installed to the engine and electrically connected with said feedback-controlling means.

7. An internal combustion engine having multiple cylinders, comprising:
- an intake manifold divided into branches which are connected to the cylinders, respectively;
- a throttle valve disposed in said each intake manifold branch,
- an idle control valve arranged to each throttle valve, said idle control valve changing an engine speed (engine torque) of each cylinder by changing its state;
- means setting a target value of an idle engine speed;
- means for calculating an engine speed in a combustion stroke time of each cylinder; and
- means for controlling said idle control valve, which changes an opening state of said idle control valve so that a signal from said engine speed calculating means is adjusted to a signal from said target value setting means.

* * * * *